US012576658B2

(12) United States Patent
Nakagawa et al.

(10) Patent No.: US 12,576,658 B2
(45) Date of Patent: Mar. 17, 2026

(54) IMAGE PROCESSING APPARATUS, IMAGE PROCESSING METHOD, AND PRINTING APPARATUS

(71) Applicant: CANON KABUSHIKI KAISHA, Tokyo (JP)

(72) Inventors: Junichi Nakagawa, Tokyo (JP); Yuto Kajiwara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 362 days.

(21) Appl. No.: 18/327,132

(22) Filed: Jun. 1, 2023

(65) Prior Publication Data

US 2023/0391121 A1 Dec. 7, 2023

(30) Foreign Application Priority Data

Jun. 6, 2022 (JP) ................................. 2022-091450

(51) Int. Cl.
*B41J 29/38* (2006.01)
*G06K 15/02* (2006.01)
*G06K 15/10* (2006.01)

(52) U.S. Cl.
CPC ........... *B41J 29/38* (2013.01); *G06K 15/105* (2013.01); *G06K 15/1809* (2013.01); *G06K 15/1823* (2013.01); *G06K 2215/0094* (2013.01); *G06K 2215/101* (2013.01)

(58) Field of Classification Search
CPC .. G06K 15/105; G06K 1/121; G06K 15/1823; G06K 2215/101; G06K 7/1413; G06K 7/1417; G06K 15/02; G06K 15/1874; G06K 15/1809; B41J 2/36; B41J 2/2135; B41J 29/393; B41J 29/38
See application file for complete search history.

(56) References Cited

U.S. PATENT DOCUMENTS

| | | | | |
|---|---|---|---|---|
| 6,568,790 B1* | 5/2003 | Sugiyama | .............. | B41J 2/2103 347/43 |
| 2004/0150687 A1* | 8/2004 | Matsuyama | ........... | B41J 11/009 347/104 |
| 2007/0153046 A1* | 7/2007 | Kanematsu | ............ | G06K 15/02 347/19 |
| 2009/0251503 A1* | 10/2009 | Kashimoto | ............ | B41J 19/145 347/14 |
| 2021/0094289 A1* | 4/2021 | Tatematsu | .................. | B41J 2/15 |

FOREIGN PATENT DOCUMENTS

JP 2010-218356 A 9/2010

* cited by examiner

*Primary Examiner* — Thinh H Nguyen
(74) *Attorney, Agent, or Firm* — Venable LLP

(57) ABSTRACT

An image processing apparatus includes an obtaining unit to obtain image data, a judgment unit to judge whether a barcode is included in the image data for each piece of band data corresponding to a printable region by scanning a printing unit, the barcode formed of a region in which bars are arranged side-by-side in a direction in which the printing unit scans over a printing medium, the judgment unit judging whether to use only a black printing element in the scanning for printing the band data. A determination unit determines the number of times to perform scanning for completing printing the piece of band data judged as not including the barcode is a first number, and that the number of times to perform scanning for completing printing the piece of band data judged as including the barcode by the judgment unit is a second number greater than the first.

13 Claims, 11 Drawing Sheets

509

IMAGE PROCESSING APPARATUS, IMAGE PROCESSING METHOD, AND PRINTING APPARATUS

CROSS REFERENCE TO PRIORITY APPLICATION

This application claims the benefit of Japanese Patent Application No. 2022-091450, filed Jun. 6, 2022, which is hereby incorporated by reference herein in its entirety.

BACKGROUND OF THE INVENTION

Field of the Invention

The present invention relates to an image processing apparatus, an image processing method, and a printing apparatus.

Description of the Related Art

A printing system has heretofore been known that prints a barcode on a printing medium by using an inkjet (IJ) printer. Barcodes are required to be printed accurately in order to be accurately read and subjected to subsequent processes. Japanese Patent Laid-Open No. 2010-218356 (hereafter, the '356 Document) discloses a technique in which, for each dot forming an image of a barcode, the ink is ejected onto the pixel multiple times to increase the dot area so that the barcode can have a certain line width.

SUMMARY OF THE INVENTION

In a case when a serial-type printer prints barcode data in which multiple bars (lines) extending in a conveyance direction are arranged side-by-side in a main scanning direction crossing the conveyance direction, there occurs characteristic vibration originating from the periodic barcode pattern and liquid surface vibration in the nozzles of the print head. In a case where the frequency of the liquid surface vibration and the frequency of the characteristic vibration match each other, a resonance phenomenon occurs, which amplifies the liquid surface vibration and thereby decreases the ejection stability. This leads to a possibility of lowering the accuracy of formation of ink droplets at the time of ejection.

However, the '356 Document 1 does not include a description about a case of printing barcode data in which multiple bars are arranged side-by-side in the scanning direction, and does not take the decrease in ejection stability due to the above-described resonance phenomenon into account.

An image processing apparatus according to an aspect of the present disclosure includes an obtaining unit configured to obtain image data, a judgment unit configured to judge whether a barcode is included in the obtained image data for each piece of band data corresponding to a region printable by scanning a printing unit including a plurality of printing elements once, the barcode being formed of a region in which bars are arranged side-by-side in a direction in which the printing unit is scanned over a printing medium, and a determination unit configured to determine that the number of times to perform scanning for completing printing the piece of band data judged as not including the barcode by the judgment unit is a first number of times, and that the number of times to perform scanning for completing printing the piece of band data judged as including the barcode by the judgment unit is a second number of times larger than the first number of times.

Further features of the present invention will become apparent from the following description of exemplary embodiments with reference to the attached drawings.

DESCRIPTION OF THE EMBODIMENTS

Embodiment 1

<Description of Inkjet Printing Apparatus>

Figure 1:
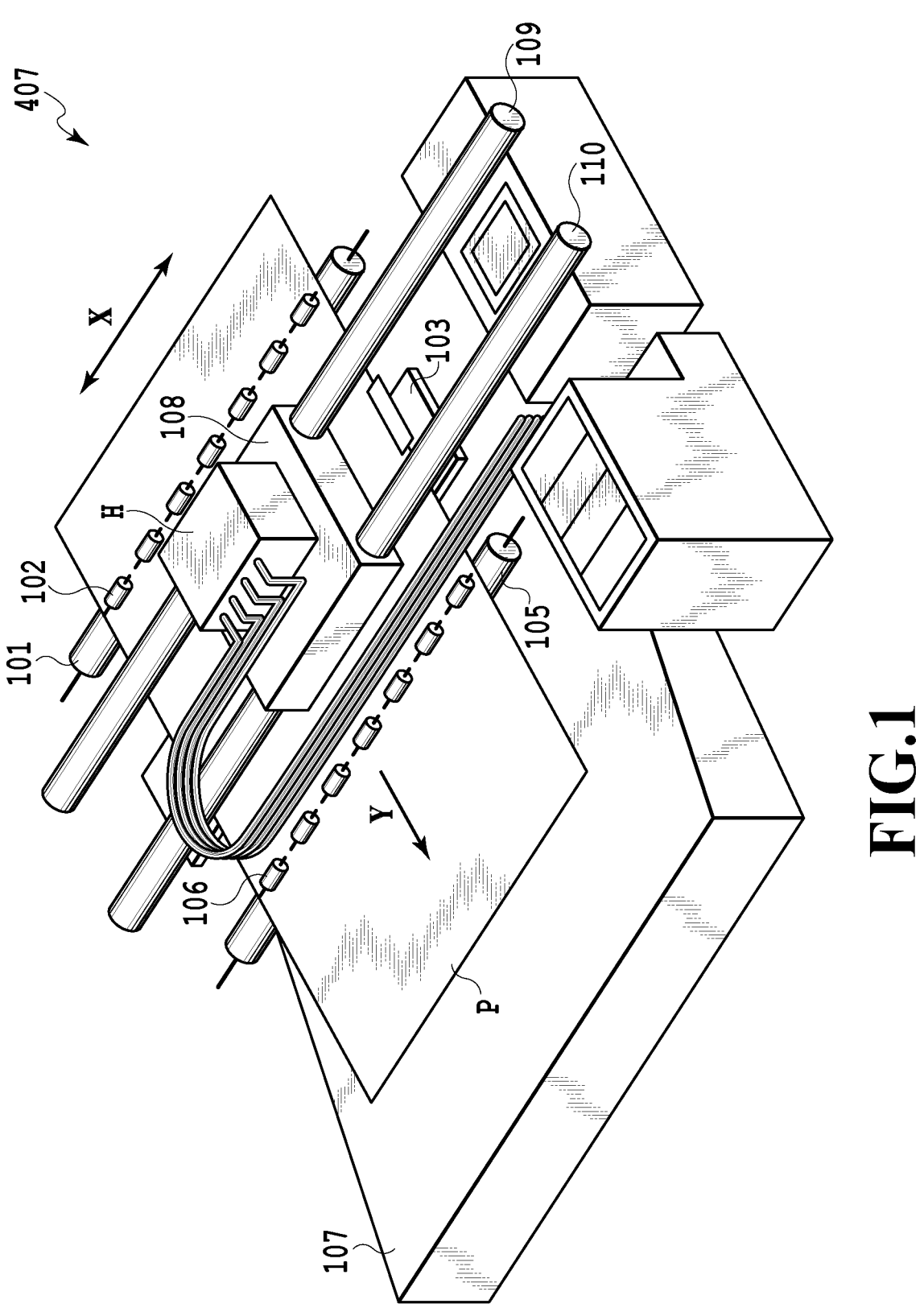
FIG. 1 is a view schematically illustrating an inkjet printer.

FIG. 1 is a view generally illustrating a printing unit of an IJ printing apparatus 407 (hereafter "printing apparatus 407") that performs printing by multi-pass scanning. A printing medium P fed to the printing unit is conveyed in the direction of the arrow Y in FIG. 1 (sub scanning direction) by a nipping part including a conveyance roller 101 disposed on a conveyance path and pinch rollers 102 that follow this conveyance roller 101 with rotation of the conveyance roller 101.

A platen 103 is provided at a printing position opposed to the surface of an IJ-type print head H in which nozzles are formed (ejection surface). By supporting the back surface of the printing medium P from below, the platen 103 maintains a constant distance between the front surface of the printing medium P and the ejection surface of the print head H.

A region of the printing medium P subjected to printing on the platen 103 is nipped between a discharge roller 105 and spur rollers 106 that follow this discharge roller 105 and conveyed in the Y direction with rotation of the discharge roller 105 and is discharged onto a discharge tray 107.

The print head His detachably mounted on a carriage 108 in such an orientation that the nozzle surface faces the platen 103 or the printing medium P. The carriage 108 moves reciprocally in the X direction (main scanning direction) along two guide rails 109 and 110 with a driving force from a carriage motor. The print head H executes an ejection operation corresponding to a print signal in the course of that movement.

Figures 2A, 2B:
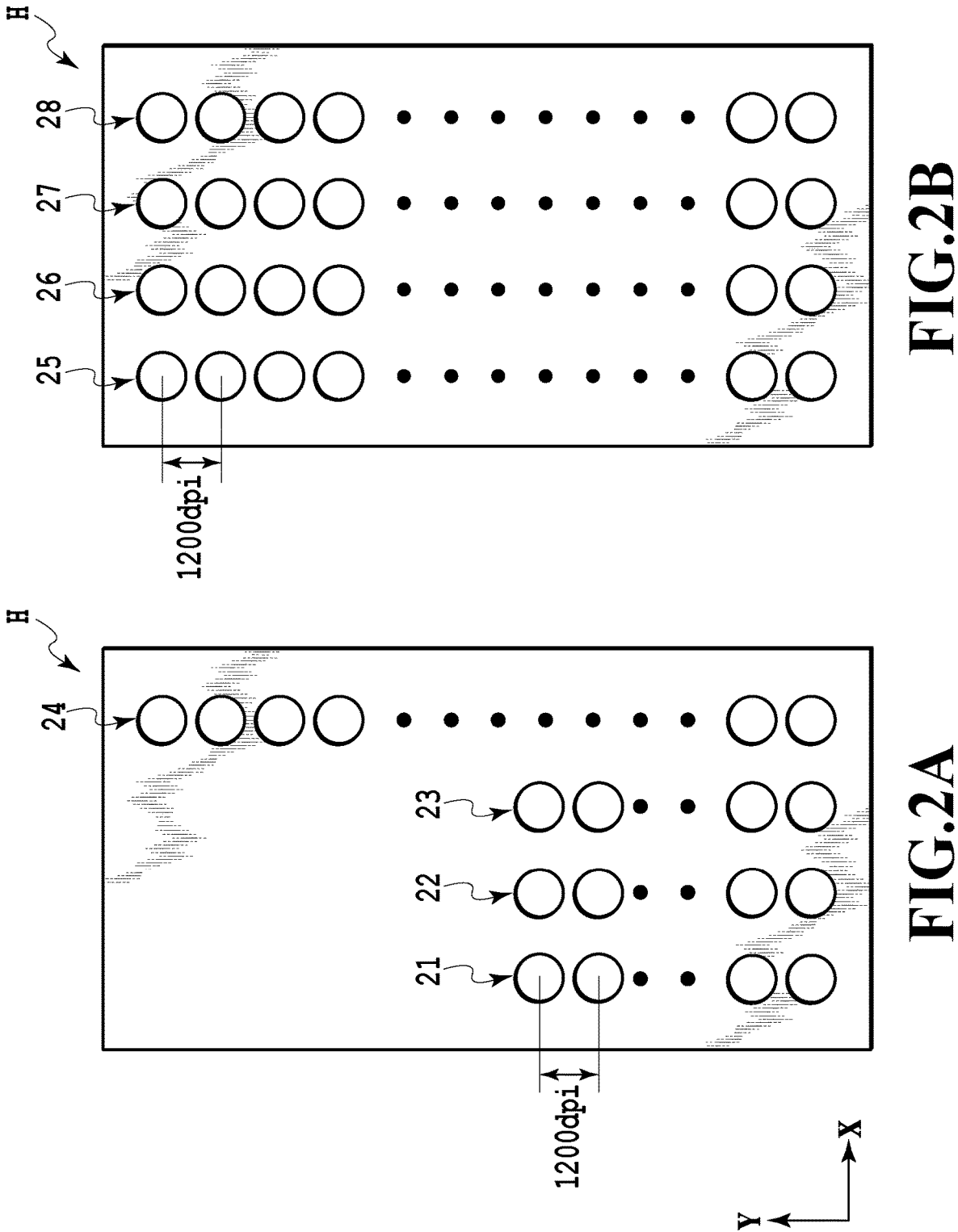
FIGS. 2A and 2B are schematic views of a print head as observed from its nozzle formation surface.

FIGS. 2A and 2B are schematic views of the print head H as observed from the nozzle formation surface. In FIG. 2A, a cyan nozzle array 21, a magenta nozzle array 22, a yellow nozzle array 23, and a black nozzle array 24 are illustrated. In FIG. 2B, a cyan nozzle array 25, a magenta nozzle array 26, a yellow nozzle array 27, and a black nozzle array 28 are illustrated.

The print head H in FIG. 2A represents a print head in which the color nozzle length is shorter than the black nozzle length in order to reduce costs, and this nozzle configuration is common for printers for home use. A nozzle length refers to the length of nozzles for use in printing in a nozzle array.

In the print head H in FIG. 2B, the color nozzle length and the black nozzle length are equal. The nozzle configuration is such that good throughput can be expected for color data as well, and is common for printers for office use, which are required to achieve higher throughput.

The nozzle arrays are arranged side-by-side in the X direction as illustrated in FIGS. 2A and 2B. In each nozzle array, nozzles for ejecting an ink are disposed at predetermined intervals in the Y direction. A printing element (heater 503 in FIG. 5) is installed immediately under each nozzle. A thermal energy generated by driving the printing element generates a bubble in the ink immediately under the printing element, which in turn ejects the ink from the nozzle. Incidentally, in the following description, an array of nozzles that eject the same amount of an ink of the same color will be referred to as "nozzle array" for simplicity. Incidentally, in the present embodiment, the print head is not limited to a thermal inkjet head as described above, and a piezoelectric inkjet head may instead be used for ink application. In the following, inks are described as printing materials with which to perform printing, but materials other than inks may actually be used.

The X direction, in which the carriage 108 moves, is a direction crossing the Y direction, in which printing media are conveyed, and is called a "main scanning direction". On the other hand, the Y direction, in which printing media are conveyed, is called a "sub scanning direction". An image is formed in a stepwise manner on the printing medium P by alternately repeating a main scan of the carriage 108 and the print head H (movement with printing), and conveyance of the printing medium (sub scan).

Figure 3:
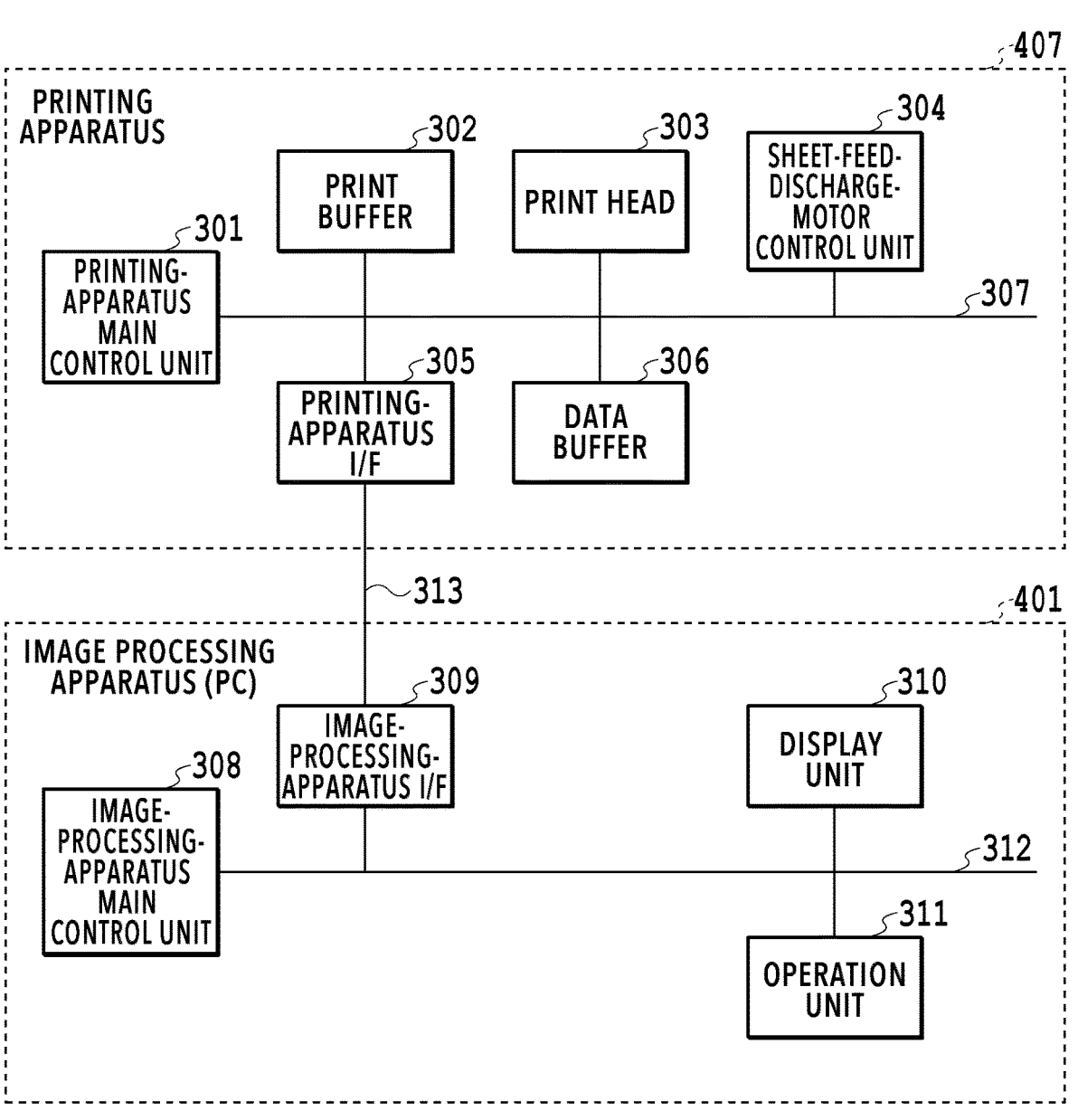
FIG. 3 is a diagram illustrating a hardware configuration of a printing system.

FIG. 3 is a block diagram explaining a control configuration of an IJ printing system applicable to the present embodiment. In FIG. 3, a printing-apparatus main control unit 301 is for controlling the whole printing apparatus 407, and includes a central processing unit (CPU), a read-only memory (ROM), a random access memory (RAM), etc. A print buffer 302 stores image data before being transferred to a print head 303 in the form of raster data. The print head 303 is an IJ-type print head having multiple nozzles capable of ejecting ink droplets, and ejects an ink from each nozzle according to the image data stored in the print buffer 302. In the present embodiment, the print head H and the print head 303 refer to similar elements. A sheet-feed-discharge-motor control unit 304 controls conveyance or feed and discharge of printing media. An interface (I/F) 305 sends and receives data signals to and from an image processing apparatus 401. An I/F signal line 313 connects the two apparatuses. A data buffer 306 temporarily stores image data received from the image processing apparatus 401. A system bus 307 connects functions of the printing apparatus.

On the other hand, an image-processing-apparatus main control unit 308 mainly performs creation of images or control of image data in the image processing apparatus 401, and includes a CPU, a ROM, a RAM, etc. An I/F 309 sends and receives data signals to and from the printing apparatus 407. A display unit 310 displays various pieces of information to the user, and a liquid crystal display (LCD), or the like, can be used, for example. An operation unit 311 is an operation unit with which the user performs operations. For example, a keyboard and a mouse can be used. A system bus 312 connects the image-processing-apparatus main control unit 308 and functions.

<General Description of Printing System>

Figure 4:
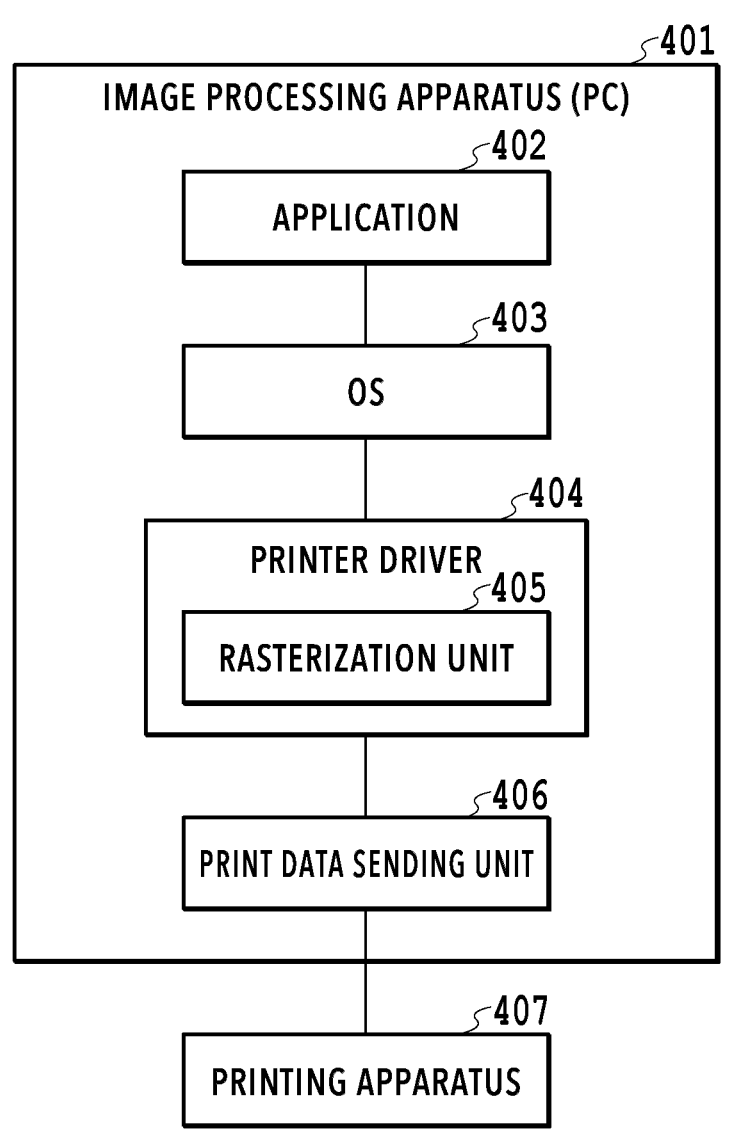
FIG. 4 is a diagram illustrating a general software configuration of the printing system.

FIG. 4 is a diagram illustrating an outline of data processing in the image processing apparatus 401. The printing system in FIG. 4 includes the image processing apparatus 401 and the printing apparatus 407. The image processing apparatus 401, which serves as a host, sends print data containing a barcode, and the printing apparatus 407 performs a printing operation based on that print data. The image processing apparatus 401 includes an application 402, an operating system (OS) 403, a printer driver 404, and a print data sending unit 406. The application 402 is an application capable of inserting barcode data into an image. In response to an instruction from the printer driver 404, the application 402 combines data obtained by a function necessary for image processing that is provided by the OS 403 and data obtained by the application 402 and converts them into print data. The printer driver 404 performs the later-described image processing on the image data received. A rasterization unit 405 rasterizes (bitmaps) the image data and converts it into print data in a data form receivable by the printing apparatus 407. The converted print data is transferred to a print data sending unit 406 and sent to the printing apparatus 407.

Next, how a preset character string is sent in the form of barcode data to the printing apparatus 407 in this printing system will be described. Generally, barcode data is a preset character string converted into a combination of one-dimensional bars and spaces with a barcode font, and is an expression in a form readable by a reading apparatus. A barcode is formed of a combination of parallel and rectangular bars and spaces. Each barcode type is characterized by the bar and space widths. A binary-level barcode may have two widths. A multi-level barcode may have multiple widths such as four widths. Generally, multi-level barcodes have a greater number of widths than binary-level barcodes, and are therefore less tolerable to variation in width and require higher printing accuracy.

In response to inputting a character string, the application 402 invokes the printer driver 404 through the OS 403. Then, barcode font information stored in the printer driver 404 is requested, and the user sets a designated barcode font. The barcode font information contains information such as a barcode font name selected from among pre-registered barcode types, the height or the width of the barcode font. Examples include the Japanese Article Numbering (JAN) code, CODE 39, CODE 128, and so on.

The application 402 sends information in which those setting values and the image data are thus combined to the printer driver 404 through the OS 403. Thereafter, using the designated barcode font, the rasterization unit 405 rasterizes the image data into barcode data formed of a combination of one-dimensional bars and spaces. The rasterized data is converted into print data in a data form receivable by the printing apparatus 407, and transferred to the print data sending unit 406 and sent to the printing apparatus 407.

While a configuration in which the application 402 invokes a barcode font of the printer driver 404 through the OS 403 has been described, the present embodiment is not limited to this configuration.

<Description of Adverse Effect of Resonance Phenomenon on Image>

In a case of printing barcode data in which bars are arranged side-by-side horizontally relative to the conveyance direction by one-pass printing, the ejection accuracy of the print head may drop due to resonance of the characteristic vibration of the barcode pattern in the main scanning direction and the liquid surface vibration in the print head nozzles. Specifically, sub droplets such as satellites may scatter on the background regions between the bars forming the barcode, and deteriorate the quality of the barcode. In a case when the quality of the barcode is deteriorated, it may take time to read the barcode or a reading failure may occur.

This phenomenon will be described in detail by using FIGS. 5A to 5F. FIGS. 5A to 5F are cross-sectional views of a nozzle in the head H. FIGS. 5A to 5F illustrate how an ink is ejected from the nozzle in a stepwise manner. An individual nozzle 501 includes an ejection port 500, a liquid channel 502, and a heater 503 serving as a printing element. The liquid channel 502 is filled with an ink 504.

Figures 5A, 5B, 5C, 5D, 5E, 5F:
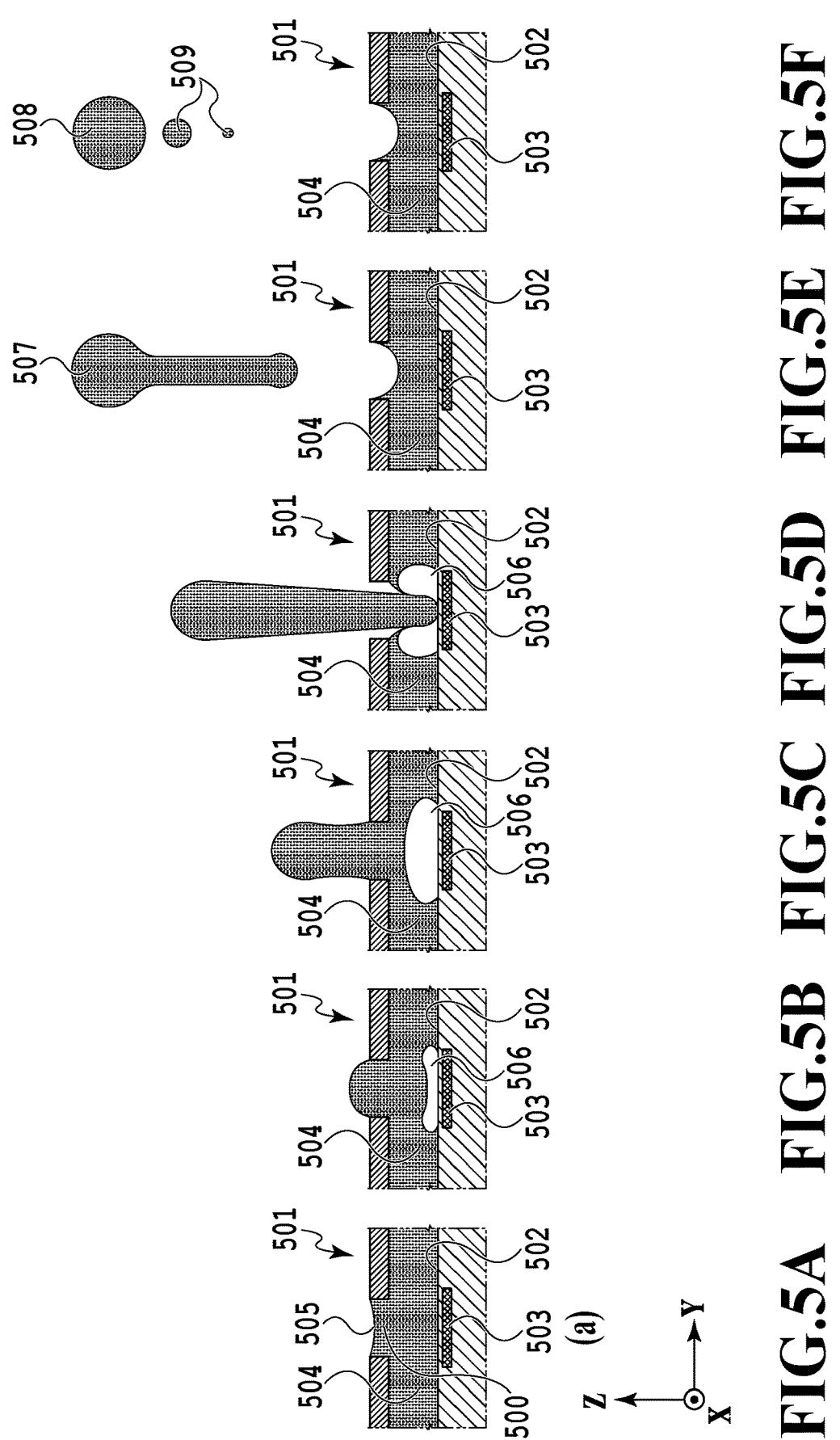
FIGS. 5A to 5F are cross-sectional views of a nozzle for explaining an influence of meniscus vibration.

As illustrated in FIG. 5A, the ink in the ejection port 500 forms a concave meniscus 505. Constituent particles in the liquid receive a force that causes them to attract one another. While particles inside the liquid receive forces from various directions, particles at the surface of the liquid do not receive forces from the surface in contact with the outside (air). For this reason, the particles at the surface of the liquid receive a force that pulls them toward the inside (nozzle side) so as to reduce the surface area (surface tension). This phenomenon results in the formation of the concave meniscus 505.

The heater 503, which serves as a printing element, generates heat in response to instantaneous application of a constant voltage thereto, thus generating a bubble 506 as illustrated in FIG. 5B in the ink contacting this heater. As that bubble grows, the ink in the liquid channel 502 is pushed out of the ejection port 500 and ejected in the form of an ink droplet 507 of a given amount.

FIGS. 5A to 5F illustrate the process of ejection in chronological order. FIG. 5A illustrates a steady state in which the ink is yet to be ejected. FIG. 5B illustrates a state where the voltage starts being applied to the heater 503. In response to application of a voltage pulse corresponding to an ejection signal, the heater 503 abruptly generates heat, thereby causing film boiling inside the liquid contacting the heater 503. FIG. 5B illustrates a state where the bubble 506 is generated by the film boiling. Since the bubble 506 is generated, the liquid surface 505 accordingly moves in the z direction (the upward direction in FIGS. 5A to 5F), so that the ink 504 is pushed out in the z direction.

FIG. 5C illustrates a state where the volume of the bubble 506 generated by the film boiling has increased, thereby pushing the ink 504 further out in the z direction.

FIG. 5D illustrates a state where the bubble 506 is communicating with the atmosphere. In the present embodiment, at a contraction stage after the bubble 506 has fully grown, the bubble 506 and the gas-liquid interface having moved from the ejection port 500 to the heater 503 side communicate with each other.

FIG. 5E illustrates a state where the ink droplet 507 has been ejected. The liquid that had already projected from the ejection port at the time when the bubble 506 communicated with the atmosphere, as illustrated in FIG. 5D, now exits the liquid channel 502 with its own inertia and flies in the form of the ink droplet 507 in the z direction. In the liquid channel 502, on the other hand, the amount of the liquid consumed by the ejection is supplied from both sides of the ejection port by capillary force in the liquid channel 502, so that a meniscus is formed in the ejection port again. Then, the ink 504 flows again in the y direction as illustrated in FIG. 5A.

FIG. 5F illustrates how the ink droplet is ejected. In a case when the liquid surface vibration of the meniscus is unstable, the ink droplet 507 does not stay as a single droplet but slits into a main droplet 508 and sub droplets 509 in some cases. The size of such a sub droplet 509 increases or its distance to another sub droplet increases the more unstable the liquid surface vibration becomes.

In particular, in a case of printing a series of bars and spaces like a barcode, i.e., a pattern that involves periodically repeating ink ejection and no ink ejection, a resonance phenomenon in which the meniscus vibration gets amplified occurs if the frequency of the meniscus vibration and the frequency of the characteristic vibration match each other. In a case the resonance phenomenon occurs, it induces further ejection instability, which leads to a possibility of such an ejection failure that sub droplets as illustrated in FIG. 5F scatter.

Figure 6:
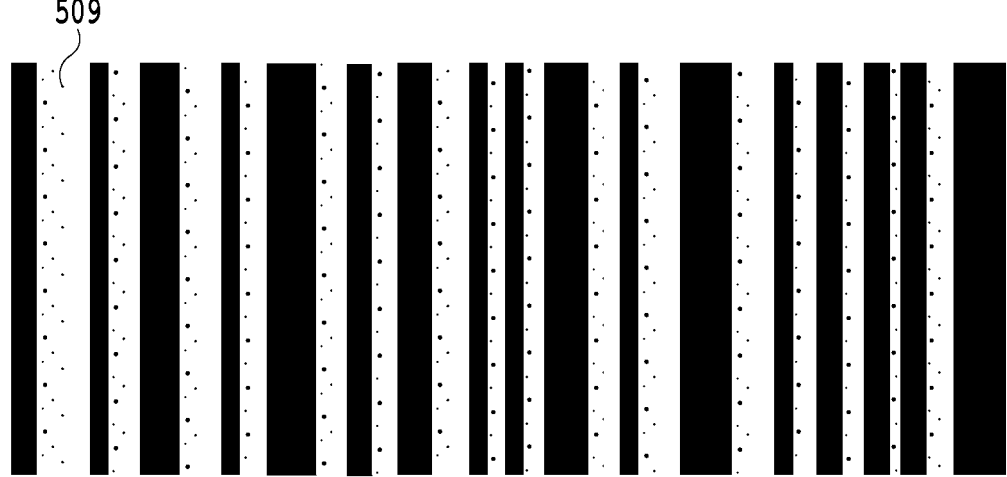
FIG. 6 is a view illustrating an example of a barcode.

FIG. 6 is a view illustrating an example of a printed barcode with multiple bars arranged side-by-side in the main scanning direction. As illustrated in FIG. 6, sub droplets 509 have scattered to the right of the bars. This is because sub droplets generated by the liquid surface vibration described with reference to FIG. 5F landed after the main droplets. In a case when such sub droplets 509 scatter onto the space portions of a barcode, a problem such as a failure to read the barcode may occur.

Next, how forming a barcode image by the unstable ejection described above affects reading of the barcode will be described. Apparatuses that optically read a barcode (barcode readers) include a contact type and a non-contact type. As a person brings a barcode reader close to a barcode, a red light beam emitted from a reading window is applied to the barcode to read it.

Figure 7:
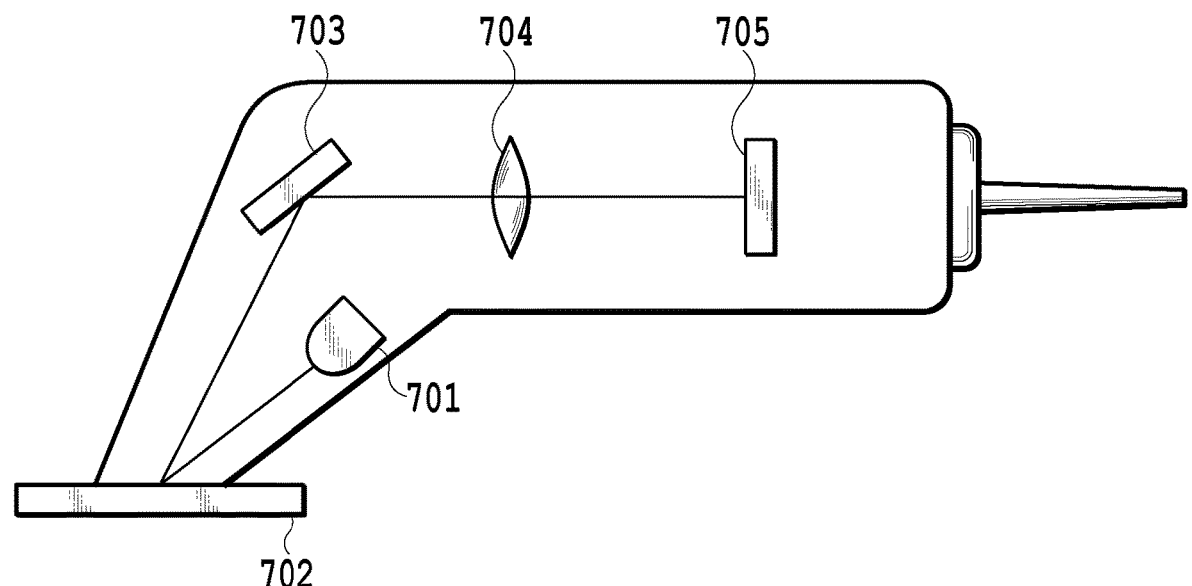
FIG. 7 is a transparent view of a barcode reading apparatus.

A barcode reader employing a charge-coupled device (CCD) scanning method will be described as an example by using FIG. 7. The CCD scanning method involves evenly irradiating a barcode 702 with a light beam emitted from a red LED 701, refracting an image of the barcode with a mirror 703, and projecting the image on a CCD sensor 705 with a lens 704. The CCD sensor 705 is a line sensor with about 1000 to 2000 one thousand to two thousand light sensors aligned in a single array and converts light into an electrical signal, and outputs this sequentially from the one at an end. Since the amount of reflected light from a bar portion is low, a small electrical signal is output for the bar portion. Since the amount of reflected light from a space portion is great, a large electrical signal is output for the space portion. Only a part of the barcode is read with the red LED, and the reading accuracy drops in a case when the quality of that part is low.

Reading of a barcode with a barcode reading apparatus involves various evaluation values. Minimum reflectance, symbol contrast, minimum edge contrast, modulation, defect, and decodability, which are representative evaluation items, will be described below. Of these, the modulation and the defect are influenced by the above problem, which deteriorates the quality of a barcode.

The minimum reflectance is the smallest reflectance within the entire barcode. In a case when it is 50% or less of the maximum reflectance, the barcode is readable. The symbol contrast is the difference between the maximum reflectance and the minimum reflectance within the entire barcode. It is represented by a value derived by subtracting the lowest reflectance within a bar from the highest reflectance within a space. The greater that value is, the easier it is to read the barcode.

The minimum edge contrast is the smallest value of the difference between the reflectance of a space and the reflectance of a bar adjacent to that space. In a case when the smallest value is 15% or more, the barcode is readable. The modulation is the ratio of the minimum edge contrast to the symbol contrast. The greater the difference between the reflectance of a space and the reflectance of a bar adjacent to that space, the easier it is to read the barcode.

The defect is a missing portion (void) in a bar or dirt (spot) in a space. In a case when a space has one ridge portion at which a maximum reflectance is reached and a valley portion where the reflectance is not uniform, then, the smaller the difference between the maximum reflectance at the ridge portion and the reflectance at the valley portion, the easier it is to read the barcode. For bars, the ridge and valley portions are reverse of those in spaces.

The decodability is a degree of tolerance in a case of deriving a value according to a decode rule defined in each barcode. The closer the actually measured values of the widths of each bar and space are to theoretical values, the easier it is to read the barcode.

In a case when the ejection stability deteriorates, the dot placement accuracy deteriorates, so that the ink is offset from the positions where it is originally desired to be landed. This widens the bar regions. In barcodes, a space is always next to a bar, and the widening of bars narrows the space regions. Moreover, as sub droplets scatter onto the spaces, isolated dots are generated and appear as spots. As described above, unstable ejection influences the modulation and the defect and deteriorates the quality of barcodes.

The possibility of an occurrence of the above resonance phenomenon is high in a case of printing a barcode formed of multiple bars arranged side-by-side in the main scanning direction by one-pass printing, as illustrated in FIG. 6. Thus, it is preferable to print a barcode by multi-pass printing, not by one-pass printing, to reduce the number of times of ejection per print scan and thereby to reduce the resonance phenomenon.

<Description of Pass Printing>

Figure 8A:
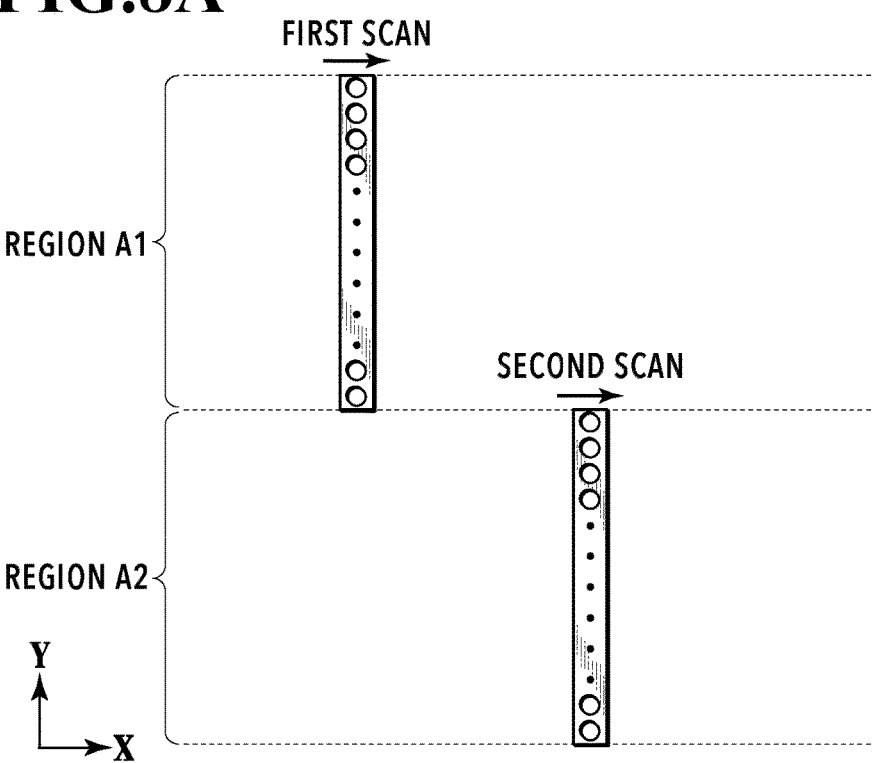
FIGS. 8A and 8B are diagrams explaining a multi-pass printing method.
Figure 8B:
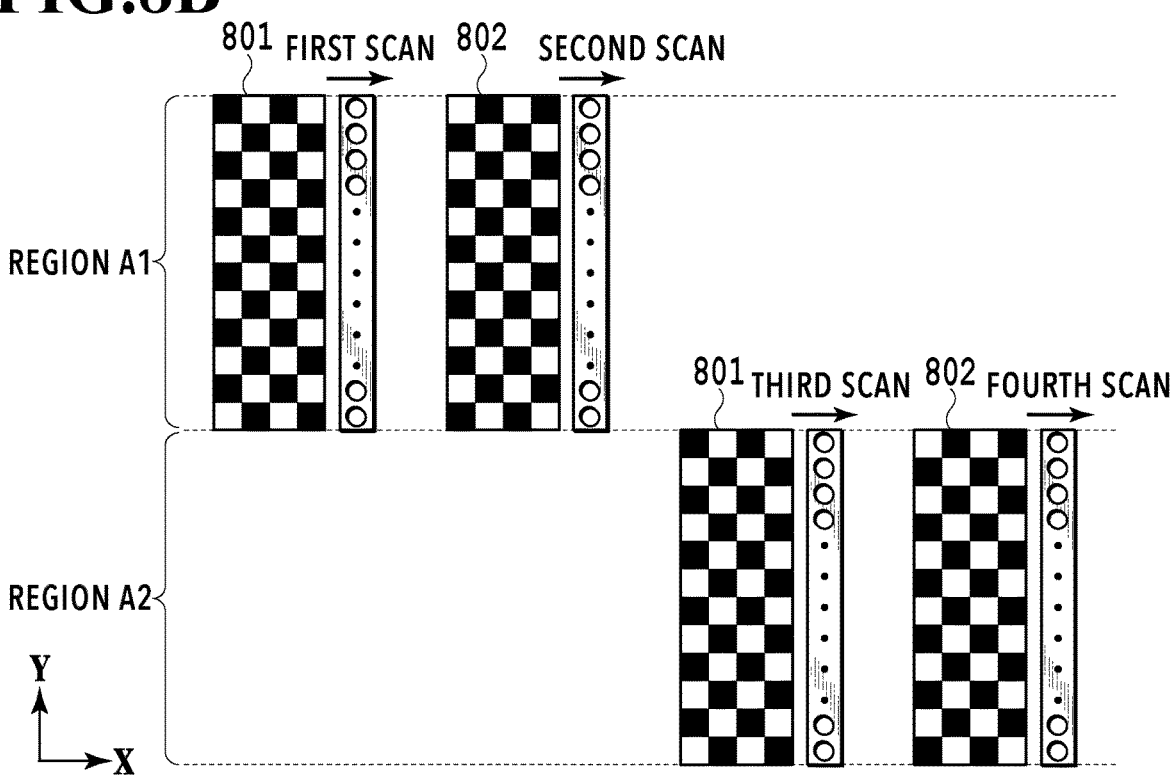

FIGS. 8A and 8B are diagrams for explaining one-pass printing and multi-pass printing employed in the present embodiment. In FIG. 8, one-pass printing and multi-pass printing are explained representatively with the black nozzle array 24, but the same applies also to the other nozzle arrays.

First, one-pass printing will be described using FIG. 8A. In the first scan, the print head H is moved along with the carriage 108 in the +X direction (forward direction) and at the same time use all nozzles to print an image on a region A1 (forward scan printing). After this first scan, the printing medium P is conveyed by a distance corresponding to all nozzles in the +Y direction. The print head H is moved back in the −X direction along with the carriage 108, and the second scan is performed. In the second scan, the print head His moved along with the carriage 108 in the +X direction and at the same time use all nozzles again to print an image on a region A2. After this second scan, the printing medium P is conveyed by a distance corresponding to all nozzles in the +Y direction. Subsequently, by alternately repeating forward scan printing by the print head H and an operation of conveying the printing medium P in the +Y direction, images are sequentially printed on the printing medium.

In the above, one-pass unidirectional printing in which an image is printed only by forward scan printing has been described. Alternatively, one-pass bidirectional printing may be employed in which an operation of conveying the printing medium P is followed by moving the print head H in the −X direction and printing an image on the region A2 (backward scan printing).

Next, multi-pass printing involving two passes will be described using FIG. 8B. First, in the first scan, the print head H is moved along with the carriage 108 in the +X direction (forward direction) and at the same time use all nozzles to print an image on the region A1 (forward scan printing). At this time, the print head H ejects the ink according to a first mask pattern 801 in which whether to permit or not to permit printing of a dot is defined. As a result, substantially half of the dot data in the region A1 is printed. Now, the print head His moved back in the −X direction along with the carriage 108. Then, in the second scan, the print head H is moved in the +X direction (forward direction) and at the same time use all nozzles to print an image on the region A1. At this time, the print head H ejects the ink according to a second mask pattern 802 having a complementing relationship with the first mask pattern. The images on the region A1 are completed by the first scan and the second scan described above.

After the second scan, the print head H is moved back in the −X direction along with the carriage 108, and the printing medium P is conveyed in the +Y direction by a distance corresponding to all nozzles.

In the third scan, the print head His moved in the +X direction and prints an image on the region A2 according to the first mask pattern 801. Now, the print head H is moved back in the −X direction along with the carriage 108. Then, in the fourth scan, the print head H is moved in the +X direction and prints an image on the region A2 according to the second mask pattern 802. The images on the region A2 are completed by the third scan and the fourth scan described above.

Subsequently, by repeating an operation of conveying the printing medium P in the +Y direction, a forward scan according to the first mask pattern, and a backward scan according to the second mask pattern, images are sequentially printed on the printing medium.

In the above, two-pass unidirectional printing in which all printing operations are performed by forward scan printing, has been described. Alternatively, two-pass bidirectional printing may be performed in which forward scan printing and backward scan printing are each performed once on the same region.

Also, in the above, multi-pass printing involving two passes has been described as an example. Multi-pass printing involving three or more passes is possible as long as print scans are performed according to mask patterns having a complementing relationship with one another.

Note that the print head H in FIG. 2A is characterized in that the black nozzle length is longer than the color nozzle length. Thus, improved throughput can be expected in a case of performing printing only with the black nozzle array 24. Of pixels arranged in a matrix, pixel data corresponding to a single array of pixels lying side-by-side in the main scanning direction will be referred to as "raster data". Also, pieces of raster data lying side-by-side that can be printed by a single scan with the number of nozzles will be referred to as "band data". In a case when raster data is data to be printed only with the black nozzles, and a series of such raster data is present as band data, the band data is determined as black band data and will be printed only with the black nozzle array 24.

There are various methods of determining whether band data is black band data such as one in which it is determined whether bitmap data after the later-described rendering processing is such that data in the raster data is RGB (0, 0, 0), or one in which data in quantized raster data is only K. Also, rasterized RGB bitmap data may be converted into the YCC color space, so that the color gamut for determination of black has a certain tolerance in consideration of noise, and the like, and the determination may be made using a histogram, or the like, for example.

Figure 9:
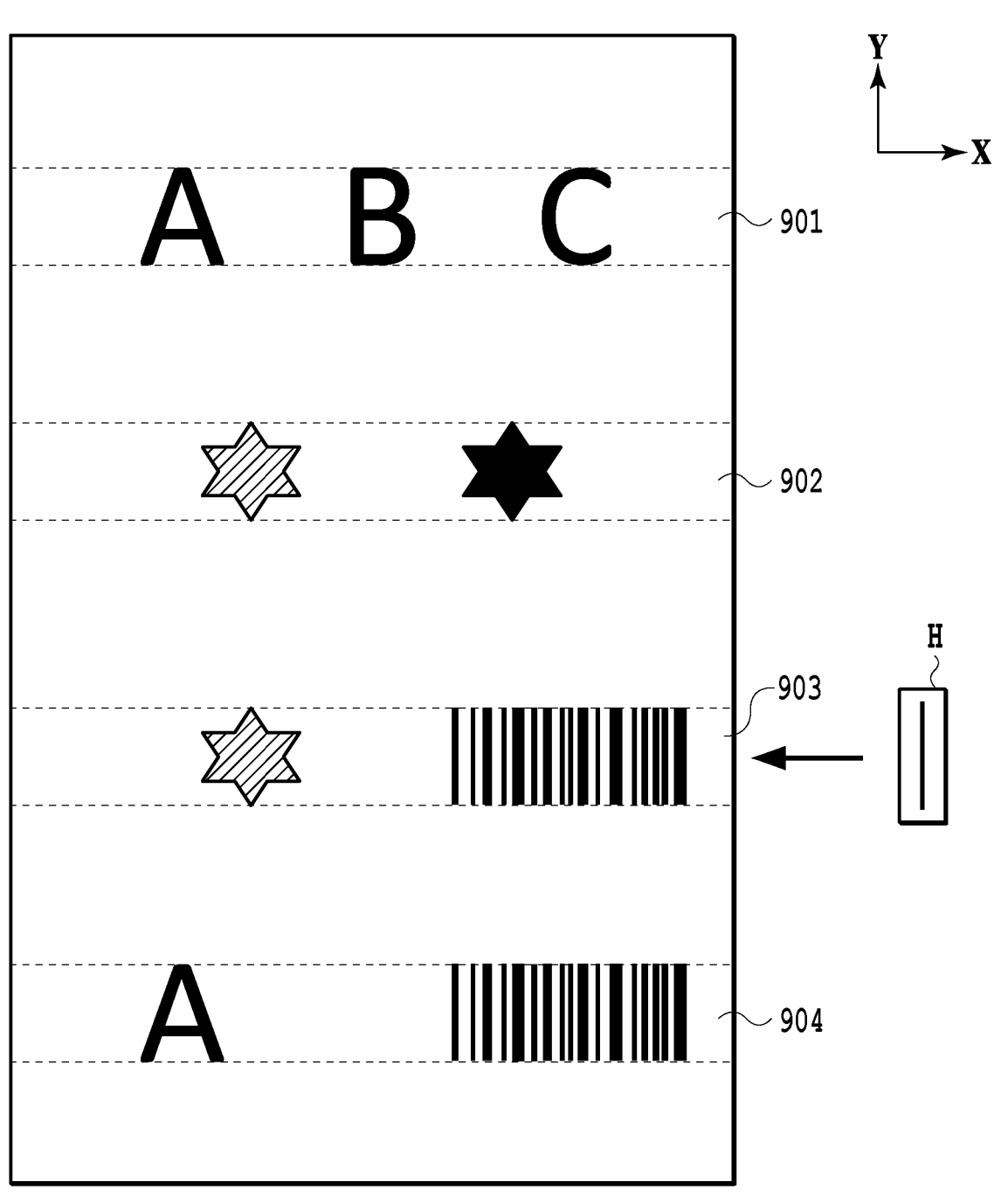
FIG. 9 is a diagram illustrating an example of an image in which objects are arranged.

FIG. 9 is a diagram illustrating an example of image data in which objects are arranged. The objects are arranged on four pieces of band data 901 to 904. On the piece of band data 901, characters are depicted in black. On the piece of band data 902, a figure depicted in a chromatic color and a figure depicted in black are arranged. On the piece of band data 903, a figure depicted in a chromatic color and a barcode are arranged. On the piece of band data 904, a character depicted in black and a barcode are arranged. The colors of the barcodes arranged on the pieces of band data 903 and 904 are black.

In this case, the pieces of band data 901 and 904 are determined as black band data, and will be printed only with the black nozzle array 24. The pieces of band data 902 and 903, on the other hand, are determined as color band data, and will be printed with a combination of the cyan nozzle array 21, the magenta nozzle array 22, the yellow nozzle array 23, and the black nozzle array 24.

An IJ printer that performs printing by multi-pass scanning as described above determines printing control with the print head's performance, output image quality, printing speed, etc., taken into account. For example, in a case of performing printing on plain paper, good throughput is often required, and an image is required to be generated by a single print scan on a region of the print product (one-pass printing).

Moreover, color unevenness may appear on a portion of data determined to be a color band in a case when the order of the colors to be printed on the printing medium is different between the forward scan and the backward scan. Hence, it is preferable to employ a printing method in which the order of application of the inks on the printing medium is fixed, such as multi-pass printing involving two passes in which a color band portion is subjected to forward scan printing first and backward scan printing thereafter, for example.

In the following, a description will be given of a method that raises the throughput while also improving the printing accuracy by determining the number of times to perform a scan according to the nozzle length of the print head and what object is arranged on the band data. Specifically, a description will be given of a method in which the number of times to perform an operation is set greater in a case of printing band data in black band data requiring higher printing accuracy, such as a barcode, than in a case of printing an object such as a character.

<Description of Flowchart in Present Embodiment>

Figure 10:
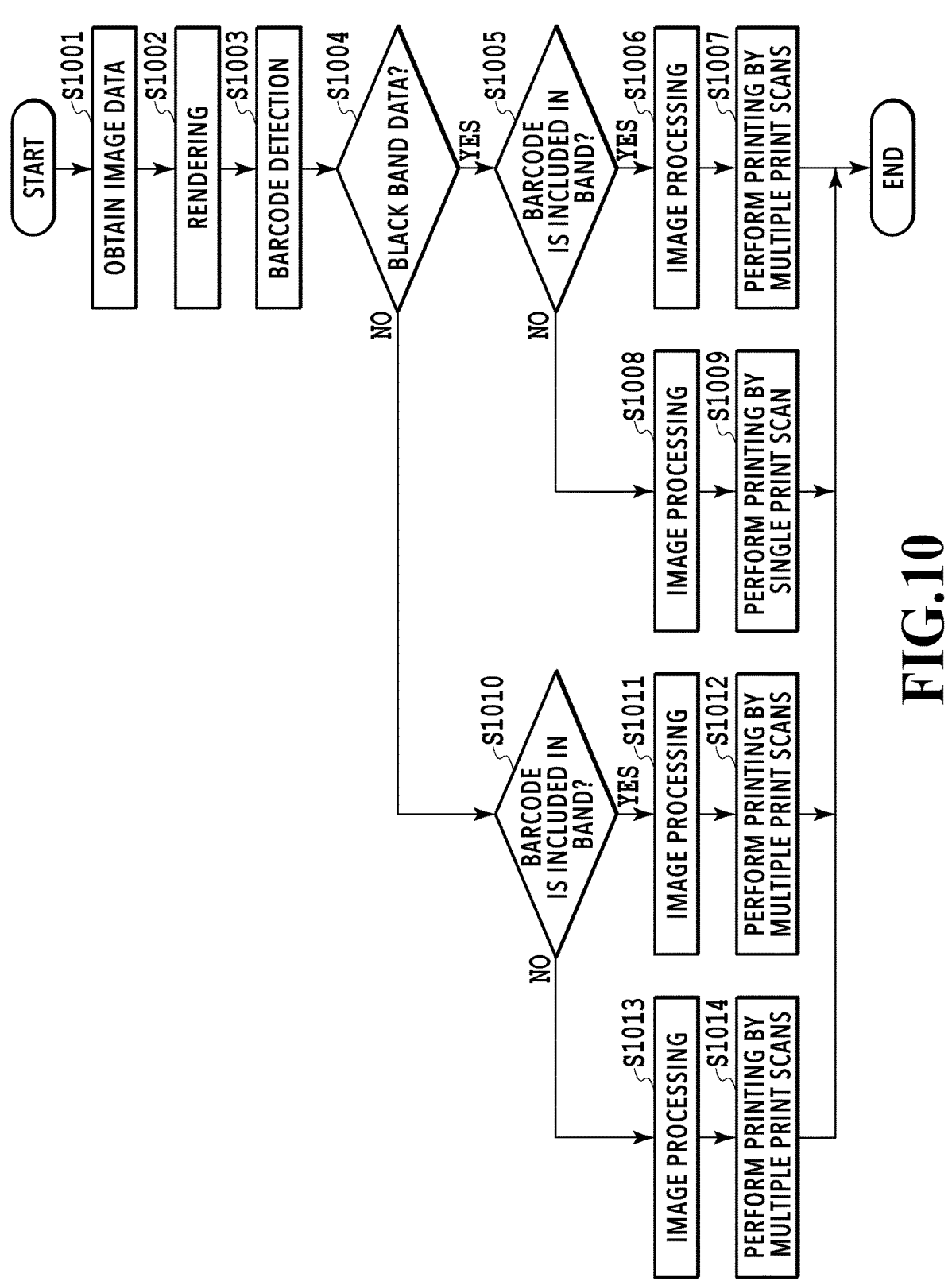
FIG. 10 is a flowchart for determining the number of scans and the scanning direction.

FIG. 10 is a flowchart explaining printing control in the present embodiment. This printing control is for determining the number of scans and the scanning direction for each piece of band data, and will also be referred to as printing method setting processing. The printer driver 404 of the image processing apparatus 401 performs the series of processes illustrated in this flowchart by loading program code stored in the ROM to the RAM and executing it. Note that "S" in the description of each process below means a step in the flowchart, and this applies also to the subsequent embodiments.

Also, in S1001, the printer driver 404 obtains image data of a single band. In the present embodiment, a configuration is employed in which pieces of band data in RGB image data are sequentially subjected to image processing. In this flowchart, a method of executing the printing method setting processing is described focusing on a single piece of band data in image data. In reality, the printing method setting processing is executed on all pieces of band data in the image data.

In S1002, the printer driver 404 performs rendering processing on the image data obtained in S1001. As a result, the vector data is rasterized. This step may also include mapping, imposition, or the like, based on the size of the sheet to be output.

In S1003, the printer driver 404 detects a barcode. At this time, the printer driver 404 obtains information on the position and size of the detected barcode. As will be described later, barcode data is formed from a barcode font in some cases. For this reason, the barcode information may be obtained in this step or detected from edge information, or the like, after bitmapping. Also, a method such as one in which the user designates the barcode information on a panel or on the host side is possible, and the method is not limited in the present embodiment.

In S1004, the printer driver 404 determines whether the band data is black band data. The printer driver 404 determines the band data as black band data in a case when the band data is formed of R=G=B=0 or R=G=B=255. Note that R=G=B=0 or R=G=B=255 is not necessarily essential for the band data to be determined as black band data. The printer driver 404 may determine the band data as black band data in a case when R, G, and B are each less than or equal to a threshold value near zero or R, G, and B are each more than or equal to a threshold value near 255. If determining the band data as black band data, the printer driver 404 advances the processing to S1005. On the other hand, if determining that the band data is not black band data, the printer driver 404 advances the processing to S1010.

In S1005, the printer driver 404 determines whether a barcode is included in the band data based on the information on the position and size of the barcode obtained in S1003. If a barcode is included, the printer driver 404 advances the processing to S1006. If a barcode is not included, the printer driver 404 advances the processing to S1008.

In S1006, the printer driver 404 performs image processing in order to convert the image data in which a barcode has been detected into a printable format. In this step, the image data output in S1003 is converted into image data supporting the color reproduction range of the printer. The image processing performed in this step will be briefly described below.

In the present embodiment, the input image data is data indicating color coordinates (R, G, B) in a color space such as sRGB, which represents expression colors for monitors. The input image data containing 8-bit data for each of R, G, and B is converted into image data in the color reproduction range of the printer (R', G', B') by a known method, such as matrix calculation processing or processing using a three-dimensional lookup table (LUT).

Next, the image data containing 8-bit data for each of R', G', and B' is converted into image data with color signal data of the ink to be used by the printer. In the present embodiment, black (K), cyan (C), magenta (M), and yellow (Y) inks are used, and the image data formed of RGB signals is converted into image data formed of 8-bit color signals representing K, C, M, and Y. This color conversion is performed using a three-dimensional LUT and interpolation calculation together. Like the above, a method such as matrix calculation processing can be used as another conversion method. Also, an example in which the number of inks is four, namely, K, C, M, and Y, has been presented. An ink such as a light cyan (Lc) or light magenta (Lm) ink with lower density or a gray (Gy) ink may be added.

The number of dots to be printed on a printing medium and the optical density on the printing medium to be achieved by that number of dots are not in a linear relationship. Thus, to make the relationship linear, the 8-bit image data is corrected so as to adjust the number of dots to be printed on the printing medium. A one-dimensional LUT is means for converting input data into output data. Quantization processing is performed on image data with 8-bit data representing a 256-level value for each ink color to thereby generate 1-bit binary data with "1" indicating printing and "0" indicating no printing. The output of the quantization processing may be the number of ink droplets per unit area, and is not limited to 1-bit binary data with "1" indicating printing and "0" indicating no printing. The quantization method includes an error diffusion method and a dithering method, but is not limited in the present embodiment.

In S1007, the printer driver 404 instructs the printing apparatus to execute the multi-pass printing involving two passes described with reference to FIG. 8B on the black band data including a barcode. The band data in S1007 is, for example, band data in which a black character and a barcode are arranged as with the piece of band data 904 in FIG. 9.

In S1008, the printer driver 404 performs image processing similar to the one in S1006. In S1009, the printer driver 404 instructs the printing apparatus to execute the one-pass printing described with reference to FIG. 8A on the black band data including no barcode. The band data in S1009 is, for example, band data in which black characters are arranged as with the piece of band data 901 in FIG. 9.

If determining in S1004 that this band data is not black band data, the printer driver 404 determines in S1010 whether a barcode is included in the band data, as in S1005. If determining that a barcode is included, then, in S1011, the printer driver 404 performs image processing similar to the one in S1006 and advances the processing to S1012. If determining that a barcode is not included, then, in S1013, the printer driver 404 performs image processing similar to the one in S1006 and advances the processing to S1014.

In S1012, the printer driver 404 instructs the printing apparatus to print the band data, which is not black band data and includes a barcode, by multi-pass printing involving two passes. The band data in S1012 is, for example, band data in which a color figure and a barcode are arranged as with the piece of band data 903 in FIG. 9. For example, two-pass bidirectional printing using forward scan printing and backward scan printing may be performed on the color portion, and print scans with two passes or three or more passes may be performed on the barcode portion. As described above, even within the same band data, the number of print scans can be changed depending on the object or between the barcode portion and other portions.

In S1014, the printer driver 404 instructs the printing apparatus 407 to print the band data, which is not black band data and includes no barcode, by multi-pass printing involving two passes. The band data in S1014 is, for example, band data in which a color figure and a black figure are arranged as with the piece of band data 902 in FIG. 9. In the present embodiment, as mentioned above, multi-pass printing involving two passes in which forward scan printing is followed by backward scan printing is performed in consideration of the color unevenness due to a difference in the order of application between the forward scan and the backward scan. However, the multi-pass printing is not limited to this one. For example, multi-pass printing involving two passes may be performed by only forward scan printing. In a case of proceeding to S1007 or S1009, the amount of a single conveyance operation is the black nozzle length. In a case of proceeding to S1012 or S1014, the amount of a single conveyance operation is the color nozzle length.

The above is the printing control in the present embodiment.

In the multi-pass printing in S1007 and S1012, it is desirable to use mask patterns having an exclusive relationship with each other as described with reference to FIG. 8B. In this case, the mask patterns are desirably such random noise masks that each individual nozzle's ejection period will not be constant.

Moreover, to reduce the resonance phenomenon, it is effective to reduce the driving frequency of the head H. In this case, printing at a desired resolution can be achieved by slowing down the speed of movement of the carriage 108 in the X direction according to the driving frequency.

As described above, according to the present embodiment, it is possible to improve the accuracy of barcode printing. Specifically, in a case of the head configuration in which the black nozzle length is longer than the color nozzle length, the number of print scans and the conveyance amount are changed for each piece of band data based on whether there is barcode data and whether the piece of band data is to be performed only with the black ink. This makes it possible to maintain the quality of the barcode data while maintaining the throughput.

Embodiment 2

In Embodiment 1, a description has been given of a method of maintaining the quality of barcode data while maintaining the productivity in a case of employing a head configuration as in FIG. 2A in which the color nozzle length is shorter than the black nozzle length. In Embodiment 2, a description will be given of a method of maintaining the quality of barcode data while maintaining the throughput in a case of employing a head configuration as in FIG. 2B in which the color nozzle length and the black nozzle length are equal.

In Embodiment 1, each piece of band data is subjected to a black band determination to determine whether or not there is black or blank data. This makes it possible to make use of the black nozzle length, which is longer than the color nozzle length, and maintain the throughput. In Embodiment 2, no black band determination is needed since the color nozzle length and the black nozzle length are equal, that is, the conveyance amount is constant.

Figure 11:
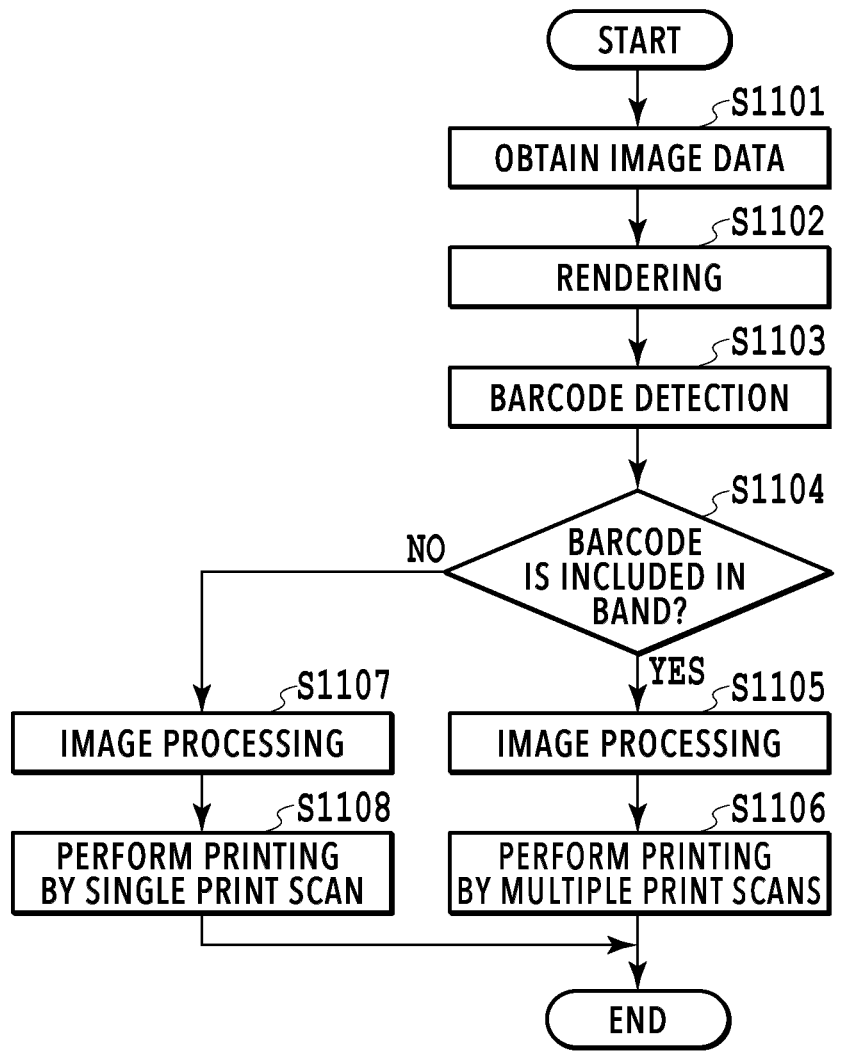
FIG. 11 is a flowchart for determining the number of scans and the scanning direction.

FIG. 11 is a flowchart of printing control in the present embodiment in a case when the black nozzle length and the color nozzle length are equal.

First, in S1101, the printer driver 404 obtains image data. In the present embodiment, a configuration is employed in which pieces of band data in RGB image data are sequentially subjected to image processing.

In S1102, the printer driver 404 performs rendering processing on the image data obtained in S1101. As a result, the vector data is rasterized. This step may also include mapping, imposition, or the like, based on the size of the sheet to be output.

In S1103, the printer driver 404 performs barcode detection on the obtained RGB image data. In S1104, the printer driver 404 determines whether a barcode is included in the band data based on the result of the barcode detection in S1103. If determining that a barcode is included, then, in S1105, the printer driver 404 performs image processing similar to the one in S1006 in FIG. 10 and advances the processing to S1106. The pieces of band data 903 and 904 in FIG. 9 correspond to the band data in this case. On the other hand, if determining that a barcode is not included, then, in S1107, the printer driver 404 performs image processing similar to the one in S1006 in FIG. 10 and advances the processing to S1108. The pieces of band data 901 and 902 in FIG. 9 correspond to the band data in this case.

In S1106, the printer driver 404 instructs the printing apparatus 407 to print the band data, which includes a barcode, by multi-pass printing involving two passes. In S1108, the printer driver 404 instructs the printing apparatus 407 to print the band data, which includes no barcode, by one-pass printing. Alternatively, as described in Embodiment 1, multi-pass printing involving two passes by forward scan printing and backward scan printing, for example, may be performed in consideration of the color unevenness due to a difference in the order of application between the forward scan and the backward scan.

Now, the color of the ink forming a barcode will be described. In the present embodiment, the ink forming a barcode is not limited to the black ink. For example, the ink combination that generates RGB (0, 0, 0) is not limited only to the black ink. In a case of a head configuration as illustrated in FIG. 2A, it is common to generate RGB (0, 0, 0) only with the black ink since using only black improves the throughput. However, in a case of the head configuration in the present embodiment, RGB (0, 0, 0) may be generated with all color inks.

In such a case, it is possible that C, M, and Y are each applied and printed in the same amount as K in addition to K. Doing so distributes the print data to each color's nozzles. Thus, focusing on each individual nozzle, it does not perform ejection at periodic intervals specific to the barcode. Accordingly, it can be said that the resonance phenomenon described in Embodiment 1 is less likely to occur, and problems are therefore less likely to occur.

Also, in a case when a barcode is made of the maximum application amount and formed by at least two print scans, it can be said that the number of times an ink is ejected from each nozzle in a single print scan decreases to half. Moreover, by using random noise masks to exclusively divide the printing between the print scans, the frequency of the characteristic vibration resulting from the period specific to the barcode changes, thereby alleviating the resonance phenomenon. Thus, in a case when the application amount of any one of the ink colors forming a barcode is more than or equal to half of the preset maximum ink application amount, it is effective to print the barcode by multiple print scans.

As described above, in a case of the head configuration in which the color nozzle length and the black nozzle length are equal, too, the number of print scans is changed based on whether there is barcode data for each piece of band data. This makes it possible to maintain the quality of the barcode data while maintaining the throughput.

Embodiment 3

In Embodiment 3, a description will be given of a method based on Embodiments 1 and 2 for preventing widening of each bar forming a barcode due to bleeding of the ink on the printing medium.

Embodiments 1 and 2, descriptions have been given of a method in which an image of a barcode portion is formed by multiple print scans to stabilize the ejection and prevent scattering of sub droplets and thereby maintain the quality of the barcode. In Embodiment 3, a description will be given of a method of preventing deterioration in the quality of a barcode due to the above-mentioned bleeding in a case of forming the image by multiple print scans.

As mentioned in the description of the meniscus in Embodiment 1, constituent particles in the liquid receive a force that causes them to attract one another. Bleeding can be reduced by performing printing utilizing that phenomenon on the printing medium.

First, in a case when an ink droplet lands on a printing medium, a force that causes the ink to impregnate the printing medium and a force that causes the ink to spread horizontally over the printing medium are exerted. The printing medium has narrow tubular voids distributed in the entirety of its inner layer. Assuming that the voids in the printing medium are collections of capillary tubes, the force that allows the ink impregnation is capillary force.

Bleeding occurs in a case when the speed at which the ink spreads horizontally over the printing medium is higher than the speed of the impregnation by the capillary force. In a case when an ink droplet is already present on a printing medium and another ink droplet lands on an adjacent region, the newly landed ink droplet and the already landed ink droplet receive a force that causes the constituent particles in the liquid to attract one another. Accordingly, the newly landed ink droplet impregnates the printing medium while being attracted to the region of the already landed ink droplet.

This phenomenon may be utilized such that, in a case of forming an image of a barcode by multiple print scans, the non-edge portion of each bar of the barcode is printed first, and the edge portion is printed thereafter. In this way, it is easier for the ink in the edge-portion region to be drawn into the non-edge-portion region. This can prevent widening of the edge of each bar and thus prevent deterioration in the reading quality of the barcode.

To implement this method, edge detection is performed in the barcode detection in S1003 in the flowchart of FIG. 10 described in Embodiment 1. While there are various edge detection methods as represented by a method using a Laplacian filter, the edge detection method is not particularly limited in the present embodiment.

The data obtained by this edge detection (edge data) is held as an attribute and forwarded to the image processing and the printing control. In this way, in a case of performing multiple print scans, it is possible to determine the print scans for printing the edge portions and the non-edge portions. For example, the non-edge portions may be printed first by multi-pass printing involving two passes, and then only the edge portions may be printed by a third print scan.

As described above, in a case of printing a barcode portion by multiple print scans, widening of each bar forming the barcode can also be prevented by detecting the edge portions and the non-edge portions and printing the non-edge portions first. In this way, a barcode with higher quality can be printed.

Other Embodiments

Multi-pass printing without intervention of a conveyance operation has been described with reference to FIG. 8B. In multi-pass printing, each print scan may be followed by a conveyance operation over a distance shorter than the nozzle length. For example, multi-pass printing involving two passes may be employed in which the nozzle array is divided into halves in the conveyance direction, and a print scan in which the two divided regions eject the ink according to mask patterns having a complementing relationship with each other, and a conveyance operation over a distance corresponding to the divided region are alternately performed. In this case, the mask patterns are desirably such random noise masks that each individual nozzle's ejection period will not be constant.

In the above embodiments, an example in which the number of inks is four, namely, K, C, M, and Y, has been presented. An ink such as a light cyan (Lc) or light magenta (Lm) ink with lower density or a gray (Gy) ink may be added.

The processes described with reference to the flowcharts in the above embodiments are performed mainly by the image processing apparatus 401, but the series of processes may be performed by the printing apparatus 407.

The present disclosure can be implemented by providing a program that implements one or more of the functions of the above embodiment to a system or an apparatus via a network or a storage medium, and causing one or more processors in a computer of the system or the apparatus to read out and to execute the program. Also, the present disclosure can be implemented with a circuit that implements one or more of the functions (e.g., ASIC).

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out to and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
   an obtaining unit configured to obtain image data;
   a judgment unit configured to judge whether a barcode is included in the obtained image data for each piece of band data corresponding to a region printable by scanning a printing unit including a plurality of printing elements once, the barcode being formed of a region in which bars are arranged side-by-side in a direction in which the printing unit is scanned over a printing medium, wherein, in a case when a color printing element that applies a color printing material and a black printing element that applies a black printing material among the plurality of printing elements included in the printing unit are such that a length of the black printing element for use in printing in a direction crossing the scanning direction is longer than a length of the color printing element for use in printing in the direction crossing the scanning direction, the judgment unit further judges whether to use only the black printing element in the scanning for completing printing the piece of band data; and
   a determination unit configured to determine that the number of times to perform scanning for completing printing the piece of band data judged as not including the barcode by the judgment unit is a first number of times, and that the number of times to perform scanning for completing printing the piece of band data judged as including the barcode by the judgment unit is a second number of times greater than the first number of times, wherein, in a case when the judgment unit judges that only the black printing element will be used and that the barcode is not included, the determination unit determines that the first number of times is one time.

2. The image processing apparatus according to claim 1, wherein, in a case of using a color printing element that applies a color printing material in scanning for the piece of band data, the determination unit determines a number of times larger than the first number of times as the number of times to perform the scanning for completing printing the piece of band data.

3. The image processing apparatus according to claim 1, wherein, in a case when the judgment unit judges that only the black printing element is to be used in the scanning for completing printing the piece of band data, the determination unit performs a conveyance operation over a distance corresponding to the length of the black printing element for use in printing after the scanning for the piece of band data, and,
   in a case when the judgment unit judges that the color printing element is to be used in the scanning for completing printing the piece of band data, the determination unit performs a conveyance operation over a distance corresponding to the length of the color printing element for use in printing after the scanning for completing printing the piece of band data.

4. The image processing apparatus according to claim 1, wherein, in a case when the judgment unit judges that only the black printing element is to be used in the scanning for completing printing the piece of band data and that the piece of band data includes the barcode, the determination unit determines that the second number of times as the number of times to perform the scanning for completing printing the piece of band data.

5. The image processing apparatus according to claim 1, wherein the first number of times is one time, and the second number of times is two times.

6. The image processing apparatus according to claim 1, wherein the judgment unit judges whether to use only the black printing element in the scanning for completing printing the piece of band data based on a preset threshold value being an RGB value.

7. The image processing apparatus according to claim 1, wherein the judgment unit further detects an edge portion of the barcode, and the determination unit determines the scanning to be performed the second number of times such that, in the scanning, the edge portion of the barcode is printed before a non-edge portion of the barcode.

8. The image processing apparatus according to claim 1, wherein the judgment unit judges that the barcode is included, the determination unit reduces a driving frequency of the plurality of nozzles in the scanning performed the second number of times.

9. The image processing apparatus according to claim 1, further comprising an instruction unit configured to instruct a printing apparatus including the printing unit to perform the scanning a number of times determined by the determination unit.

10. The image processing apparatus according to claim 1, wherein the image processing apparatus is a printing apparatus including the printing unit.

11. The image processing apparatus according to claim 1, wherein the printing unit is an inkjet print head configured to eject an ink.

12. An image processing method comprising:

obtaining image data;

judging whether a barcode is included in the obtained image data for each piece of band data corresponding to a region printable by scanning a printing unit including a plurality of printing elements once, the barcode being formed of a region in which bars are arranged side-by-side in a direction in which the printing unit is scanned over a printing medium, wherein, in a case when a color printing element that applies a color printing material and a black printing element that applies a black printing material among the plurality of printing elements included in the printing unit are such that a length of the black printing element for use in printing in a direction crossing the scanning direction is longer than a length of the color printing element for use in printing in the direction crossing the scanning direction, the judging further judges whether to use only the black printing element in the scanning for completing printing the piece of band data; and determining that the number of times to perform scanning for completing printing the piece of band data judged as not including the barcode by the judgment unit is a first number of times, and that the number of times to perform scanning for completing printing the piece of band data judged as including the barcode by the judgment unit is a second number of times larger than the first number of times.

13. A printing apparatus comprising:

an obtaining unit configured to obtain image data;

a judgment unit configured to judge whether a barcode is included in the obtained image data for each piece of band data corresponding to a region printable by scanning a printing unit including a plurality of printing elements once, the barcode being formed of a region in which bars are arranged side-by-side in a direction in which the printing unit is scanned over a printing medium, wherein, in a case when a color printing element that applies a color printing material and a black printing element that applies a black printing material among the plurality of printing elements included in the printing unit are such that a length of the black printing element for use in printing in a direction crossing the scanning direction is longer than a length of the color printing element for use in printing in the direction crossing the scanning direction, the judgment unit further judges whether to use only the black printing element in the scanning for completing printing the piece of band data; and a determination unit configured to determine that the number of times to perform scanning for completing printing the piece of band data judged as not including the barcode by the judgment unit is a first number of times, and that the number of times to perform scanning for completing printing the piece of band data judged as including the barcode by the judgment unit is a second number of times greater than the first number of times, wherein, in a case when the judgment unit judges that only the black printing element will be used and that the barcode is not included, the determination unit determines that the first number of times is one time.

* * * * *